No. 867,662. PATENTED OCT. 8, 1907.
D. W. KEMP.
SHOCK LOADER.
APPLICATION FILED JAN. 10, 1907.
3 SHEETS—SHEET 1.
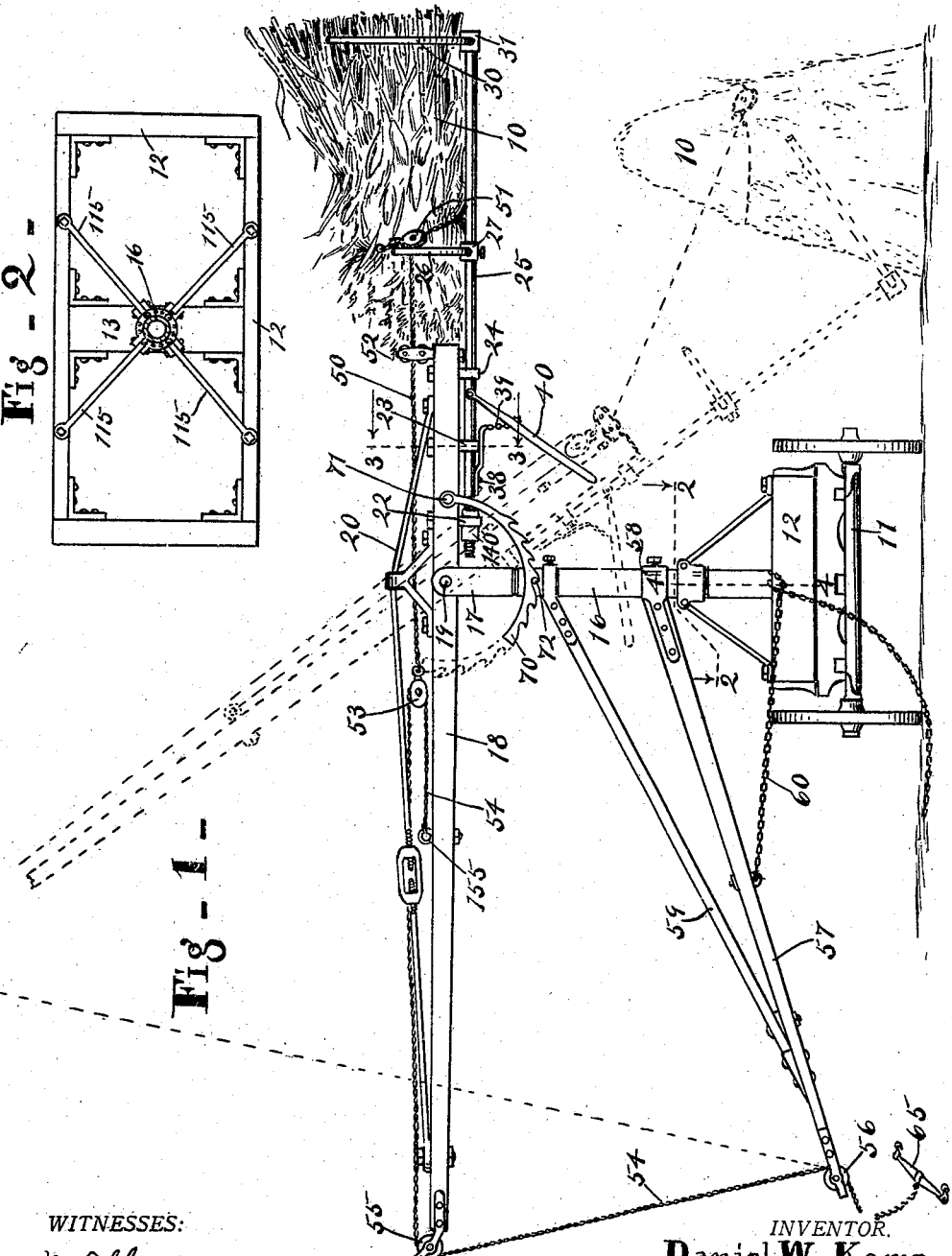
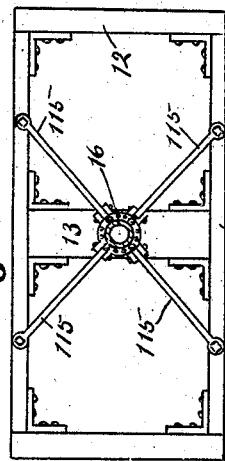
WITNESSES:
N. Allemong.
W. M. Gentle.
INVENTOR.
Daniel W. Kemp.
BY
V. H. Lockwood
ATTORNEY.

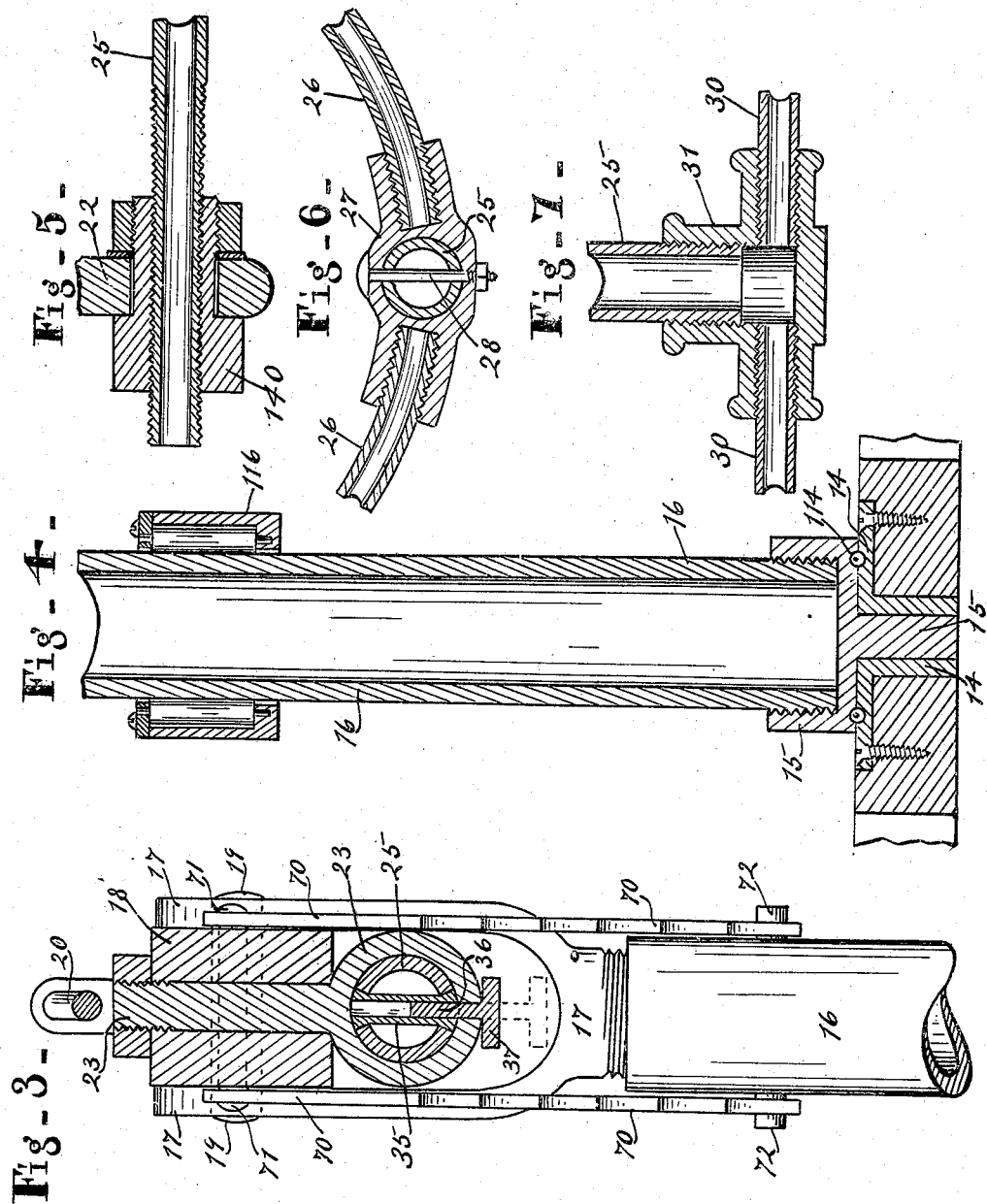

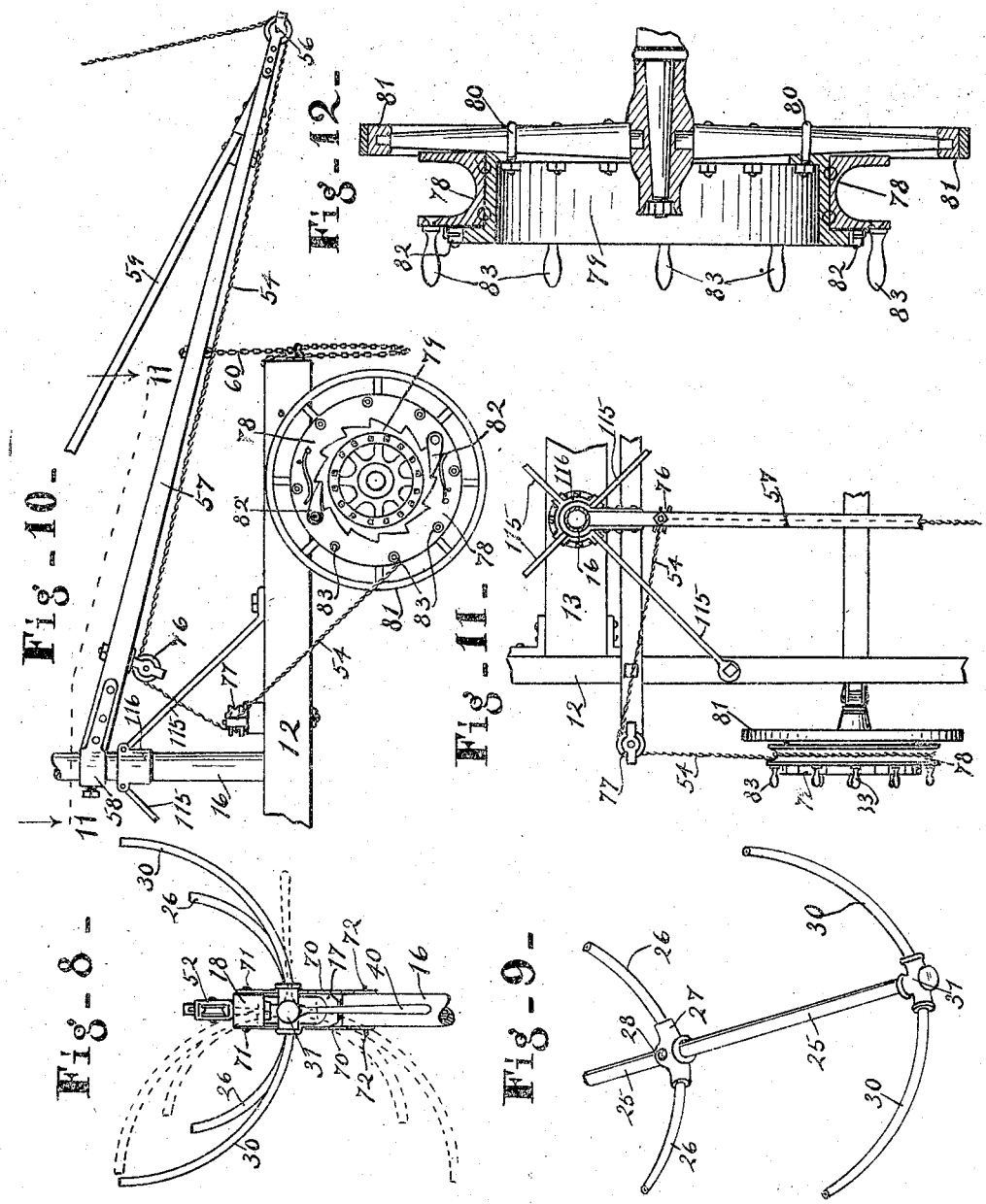

UNITED STATES PATENT OFFICE.

DANIEL W. KEMP, OF ANDERSON, INDIANA.

SHOCK-LOADER.

No. 867,662.　　　　　Specification of Letters Patent.　　　　　Patented Oct. 8, 1907.

Application filed January 10, 1907. Serial No. 351,598.

*To all whom it may concern:*

Be it known that I, DANIEL W. KEMP, of Anderson, county of Madison, and State of Indiana, have invented a certain new and useful Shock-Loader; and I do hereby declare that the following is a full, clear, and exact description thereof, reference being had to the accompanying drawings, in which like letters refer to like parts.

The object of this invention is to provide a portable mechanism for loading shocks of fodder upon wagons for hauling the same from the field.

What I have heretofore made and used, which is shown in the drawings herein, has been adapted for loading shocks of cornfodder. These shocks are very large and heavy, weighing usually about one thousand pounds. In operating a fodder-shredding machine of the type now in general use a large number of wagons is required to haul the fodder to the machine, and these wagons require a very large number of men, for loading fodder on wagons by hand is very tedious and laborious work. Only a few stalks can be taken up by a person at one time, and when a load on a wagon gets high, it is very difficult for the man on the ground to hand his load of stalks to the man on the wagon. In order to facilitate the handling of cornfodder and to reduce greatly the labor and expense connected therewith, this invention has been devised.

The chief idea consists in providing means for picking up a shock of fodder on its side and holding it in a horizontal position, and in depositing it on a wagon in such horizontal position. Fodder-holding devices heretofore used, so far as I am aware, have lowered the shock of fodder and elevated it vertically with the butts down, but in that position it is difficult and inconvenient to load the fodder on the wagon, as on the wagon the fodder should lie horizontally. With this mechanism the whole shock is placed horizontally on the wagon, and while one tier or row of shocks may have their butts extending inwardly, another row or tier may have them extending outwardly and the level of the load be thereby maintained.

To the foregoing end my invention consists broadly in providing means mounted on a movable platform that can be tilted down beside a shock of fodder, and also in means combined therewith for turning over, tilting or tipping the shock of fodder upon said receiving means, and elevating said receiving means with the fodder held horizontally, and then in turning the fodder-holding means, after the shock of fodder has been moved to a position over the wagon on which it is to be loaded, so that the shock will be discharged upon the wagon. With this device, therefore, one man can load many times more fodder than the three or four men that have usually heretofore been required to accompany each wagon.

The full nature of the invention will be understood from the accompanying drawing and the following description and claims.

In the drawings Figure 1 is a front elevation of the truck and a side elevation of a loader thereon with a shock of fodder held up in a horizontal position, the position of the shock on the ground and the inclined position of the loading beam being shown by dotted lines. Fig. 2 is a section on the line 2—2 of Fig. 1, being a plan view of the truck or wagon on which the loader is mounted and transported. Fig. 3 is a section on the line 3—3 in Fig. 1 on a much larger scale. Fig. 4 is a section on the line 4—4 of Fig. 1. Fig. 5 is a horizontal longitudinal section of the left-hand end, as appears in Fig. 1, of the shock-holding tubular bar. Fig. 6 is a vertical transverse section through said shock-holding tubular bar and the lower parts of an inner pair of the shock-holding arms diverging therefrom. Fig. 7 is a horizontal transverse section of the shock-holding tubular bar and the lower parts of the outer pair of shock-holding arms. Fig. 8 is an elevation of the right-hand end of the shock-holder and beam as it appears in Fig. 1, the shock removed, the overturned or discharging position of the parts being shown in dotted lines. Fig. 9 is a perspective view of the outer end of the shock-holder. Fig. 10 is a side elevation of the rear lower portion of a modified form of shock-holder showing means actuated by the rear wheel of the truck or wagon for operating the loader. Fig. 11 is a section on the line 11—11 of Fig. 10 showing one side of the mechanism largely in plan view, parts being broken away. Fig. 12 is a central vertical section of the vehicle wheel shown in Fig. 10.

Referring in the first place to the mechanism as shown in the first nine figures, 10 represents a shock of corn, and in dotted lines in Fig. 1 it is shown upon the ground. The loader is driven up beside the shock. There appears a truck or wagon 11 having a suitable rectangular frame 12, seen in Fig. 2, with a very strong central crossbeam 13. Upon this a bearing 14 is secured, as seen at the lower end of Fig. 4 with a central hole for the reduced end of the turntable 15. Said turntable is secured on the lower end of a hollow post 16 and between the turntable 15 and bearing 14 a series of bearing balls 114 are placed. Braces 115 extend from the sides of the frame 12 up to the sleeve 116. The upper end of the rotatable post 16 has a pair of side bars 17 secured between which the beam 18 is located and in which said beam is fulcrumed by the pivot rod 19. Consequently said beam may be tilted from a horizontal position to any inclination, and it and the post 16 may be turned laterally into any desired position. The post is strengthened by a brace rod 20.

Three strong eyes, staples or straps 22, 23 and 24 are secured to the rear or short end of said beam 18 so as to extend from the underside thereof. In these three eyes, staples or straps, the shock-holding bar 25 of the shock, holding means is mounted. This bar 25 is preferably a strong tube or gas pipe rotatable in these three bearings, 22, 23 and 24, and projects for several feet beyond the end of the beam 18, as seen in Fig. 1. Two pairs of shock-holding arms are secured to the load bar 25, as seen in Fig. 9, the inner pair of arms 26 being connected with the bar 25 in the manner shown in Fig. 6. A casting 27 is secured on the load bar 25 by a bolt 28, and the arms 26 are screwed into it. The outer shock-holding arms 30 are secured to the load bar 25, as seen in Fig. 7. There is a head 31 that screws on the outer end of the load bar 25, and the lower ends of the arms 30 are secured therein. The outer pair of arms 30 are longer and adapted to partially surround the butt of the shock while the other set of arms 26 are adapted to surround the shock near its upper end, as seen in Fig. 1.

To hold the shock in the position shown in Fig. 1, that is upon the shock-holder, it is necessary that means be provided to prevent the rotation of the load bar 25, as seen in Fig. 3. To this end the eye 23 through which the tubular load bar 25 extends, has a pair of diametric holes through it with a small tube 35 into which the locking pin 36 may project, as shown in Fig. 3. This pin is on a spring or yielding plate 37 that is fastened at 38 to the load bar 25, and at its free end carries a chain 39 that extends to the hand lever 40. This hand lever is yoke-shaped at its upper end and fulcrumed to the bar 25. When it is desired to discharge a shock from the loader, the lower end of the hand-lever is drawn downward so that the pin 36 is pulled out of its locking position, and then the shock will turn over by gravity unless it is perfectly balanced, and if it be perfectly balanced, it may be unbalanced by a slight movement of the lever 40. The shock-holder turns over substantially to the dotted line position shown in Fig. 8, during which movement the shock is discharged.

The load bar 25 is threaded so as to operate in and be held by the threaded block 140 which is held in the staple or eye 22 so that it can be turned but have no longitudinal movement. With this block said load bar is longitudinally adjusted so as to cause registry of the pin 36 on the spring 37 and the hole in the little tube 35 in said load bar and the lower part of the eye 23, as seen in Fig. 3.

In order to tip the shock over upon the loader, a cable 50 is employed that is provided with nooses to surround the shock, and thence the cable passes through a pulley 51 and over a pulley 52 on the rear end of the loader beam and to a pulley 53. The pulley 53 is drawn by the cable 54, which is fastened to the beam 18 at 155, and from this passes over the pulley 53 and thence over a pulley 55 on the forward end of the beam 18, and thence under the pulley 56 on the outer end of a bar 57 that is fulcrumed at 58 on the post 16 so as to be laterally movable or swung on said post. The outer end of the bar 57 is held down by a brace bar 59 that runs and is fulcrumed also to said post 16. A horse is hitched to the extreme end of the cable 54 by a swingle-tree 65. A cable 60 which is connected with the bar 57 is used to anchor said bar 57 in any desired position or to keep it from swinging around while the shock is being put upon the loader or discharged therefrom.

After the loader is put in position, as shown by dotted lines in Fig. 1, with reference to the shock, the noose of the cable 50 is put about the upper end of the shock, and then the horse that is hitched to the swingle-tree 65 pulls the shock over upon the loader, and as the horse keeps on pulling, it will draw the forward end of the beam 18 down until said beam is substantially horizontal, as shown in Fig. 1. Then the beam 18 is locked in its horizontal position by a curved rack bar 70 that is fulcrumed at 71 to the beam 18 and rests upon a pin 72 in the post 16. This holds the beam 18 horizontal, and the cables 50 and 54 may then be relaxed. The wagon upon which said fodder is to be loaded (said wagon not being here shown—is then driven under the shock elevated so that the shock will be over the portion of the wagon upon which it is desired to deposit the shock. The lever 40 is actuated and the shock discharged as heretofore described by merely turning the load bar 25 and arms 26 and 30 over to the dotted line position shown in Fig. 8. The loading truck is then moved to another shock and the process repeated.

The modified form shown in Figs. 10, 11, and 12, illustrates the manner of tipping the shock and tilting the beam 18 from a wheel of the truck without the use of an additional horse hitched to the swingle-tree 65. In this modified form the cable 54 runs back from the pulley 56 over a pulley 76 near the inner end of the beam 57 and thence about a horizontal pulley 77 on the side bar of the frame 12 of the truck, and thence to the drum 78, seen in Fig. 12. This drum is annular in form and mounted rotatably upon a cylinder 79 that is secured by staples 80 to the wheel 81 of the truck. The outer edge of the cylinder 79 is turned up flange-like and formed into a ratchet wheel, as seen in Fig. 10, with which a pair of spring-pressed pawls 82 engage, said pawls being mounted on the drum 78. The pawls are arranged so that when the truck is moved forward, they will engage the ratchet and cause the rotation of the drum. The drum has also handles 83 projecting therefrom so that it can be turned by hand.

The manner of operating this modified form is as follows: After the noose of the cable 50 has been placed about the upper part of the shock, the drum 78 is actuated by hand until the shock is tipped and the beam 18 tilted enough to barely lift the shock off the ground. Then the team is moved up, which causes the truck and wheel 81 to move, and to elevate the beam 18 to its horizontal position.

What I claim as my invention and desire to secure by Letters Patent is:

1. A shock-loader including means for holding and supporting a shock on its side in a horizontal position, means operative in connection therewith for tilting a shock over on the upper side of said holding and supporting means, and means for turning over said shock holding and supporting means to discharge the shock.

2. A shock-loader including a beam fulcrumed between its ends, means in connection with said beam for holding the shock sidewise, means for tilting the beam down beside the shock before it is loaded, and a cable mounted on said beam and movable longitudinally thereof and for engaging the upper portion of the shock and drawing it over upon said shock holding means.

3. A shock-loader including a vehicle, a rotary post mounted thereon, an oscillatory beam mounted on said post so that it may be tilted, transversely extending shock holding arms on said beam, and a cable mounted on said beam and movable longitudinally thereof for engaging the upper portion of the shock and drawing it over upon said shock holding arms and beam when the beam is tilted down.

4. A shock-loader including an oscillatory beam, a load bar mounted parallel with said beam and in connection therewith so as to be rotatable and to extend beyond the end of the beam, releasable means for holding said loading bar from rotation, and shock-holding arms extending laterally and upwardly from both sides of said loading bar.

5. A shock-loader including an oscillatory beam a load bar mounted parallel with said beam in connection therewith so as to be rotatable and to extend beyond the end of the beam, releasable means for holding said loading bar from rotation, and a pair of substantially semicircular shock-holding arms secured midway between their ends on said loading bar, one larger than the other, the larger being connected with the end of said loading bar so as to hold the butt of the shock, and the other at some distance from the end of said loading bar.

6. A shock-loader including a truck, a rotary post, a beam mounted oscillatory upon said post, a shock holder extending from said beam and arranged so as to hold the shock sidewise, and means for limiting and preventing the rotary movement of said post.

7. A shock-loader including a vehicle, an oscillatory beam mounted thereon, a shock-holder mounted in connection with said beam adapted to receive and hold the shock sidewise, a cable mounted in connection with said beam for both tilting a shock upon the holder and oscillating said beam, and a drum upon a wheel of the vehicle for winding up said cable.

8. A shock-loader including a vehicle, an oscillatory beam mounted thereon, a shock-holder mounted in connection with said beam adapted to receive and hold the shock sidewise, a cable mounted in connection with said beam for both tilting a shock upon the holder and oscillating said beam, a cylinder secured to the wheel of the vehicle with a ratchet thereon, a drum revoluble on said cylinder for winding up said cable, a pawl on said drum for engaging said ratchet to drive the drum, and handles on said drum for revolving it independently of the cylinder, whereby said cable may be actuated while the vehicle is standing sufficiently to lift the shock free of the ground and the subsequent elevation of the shock be accomplished by moving the vehicle.

In witness whereof, I have hereunto affixed my signature in the presence of the witnesses herein named.

DANIEL W. KEMP.

Witnesses:
N. ALLEMONG,
H. B. McCORD.